United States Patent
He et al.

(10) Patent No.: US 8,660,714 B2
(45) Date of Patent: Feb. 25, 2014

(54) AIRCRAFT SYSTEMS AND METHODS FOR PROVIDING EXHAUST WARNINGS

(75) Inventors: Gang He, Morristown, NJ (US); Dave Pepitone, Sun City West, AZ (US)

(73) Assignee: Honeywell International Inc., Morristown, NJ (US)

( * ) Notice: Subject to any disclaimer, the term of this patent is extended or adjusted under 35 U.S.C. 154(b) by 170 days.

(21) Appl. No.: 13/032,287

(22) Filed: Feb. 22, 2011

(65) Prior Publication Data

US 2012/0215385 A1 Aug. 23, 2012

(51) Int. Cl.
*G08B 21/00* (2006.01)

(52) U.S. Cl.
USPC ............. 701/3; 701/7; 340/901; 340/933; 340/945; 340/963; 340/971

(58) Field of Classification Search
None
See application file for complete search history.

(56) References Cited

U.S. PATENT DOCUMENTS

| | | | |
|---|---|---|---|
| 4,919,536 A * | 4/1990 | Komine | 356/28.5 |
| 4,965,573 A * | 10/1990 | Gallagher et al. | 340/968 |
| 5,602,543 A | 2/1997 | Prata et al. | |
| 6,157,876 A | 12/2000 | Tarleton, Jr. et al. | |
| 6,281,970 B1 | 8/2001 | Williams et al. | |
| 6,346,892 B1 * | 2/2002 | DeMers et al. | 340/945 |
| 6,424,408 B1 | 7/2002 | Ooga | |
| 6,433,861 B1 * | 8/2002 | Nagele et al. | 356/28 |
| 6,703,945 B2 * | 3/2004 | Kuntman et al. | 340/961 |
| 6,828,923 B2 * | 12/2004 | Anderson | 340/968 |
| 7,333,030 B2 * | 2/2008 | Baranov et al. | 340/963 |
| 7,444,212 B2 | 10/2008 | Pepitone | |
| 7,480,572 B2 | 1/2009 | Oertel et al. | |
| 7,557,735 B1 * | 7/2009 | Woodell et al. | 340/968 |
| 7,617,022 B1 * | 11/2009 | Wood et al. | 701/3 |
| 8,362,925 B2 * | 1/2013 | Brinkman et al. | 340/961 |
| 8,433,459 B2 * | 4/2013 | Michel et al. | 701/3 |
| 2006/0191326 A1 * | 8/2006 | Smith et al. | 73/73 |
| 2006/0256318 A1 * | 11/2006 | Curtin | 356/28 |
| 2007/0225874 A1 * | 9/2007 | Pepitone | 701/3 |
| 2008/0035784 A1 * | 2/2008 | Meserole et al. | 244/3.1 |
| 2009/0299552 A1 * | 12/2009 | Villaume et al. | 701/3 |
| 2010/0113149 A1 * | 5/2010 | Suddreth et al. | 463/31 |
| 2012/0026190 A1 * | 2/2012 | He et al. | 345/633 |

FOREIGN PATENT DOCUMENTS

| | | | |
|---|---|---|---|
| EP | 0369580 A2 | 5/1990 | |
| EP | 2182326 A1 | 5/2010 | |

OTHER PUBLICATIONS

EP Search Report, EP 12156388.6-1803/2492892 dated Feb. 21, 2013.
EP Communication, EP 12156388.6-1803 dated Feb. 28, 2013.

* cited by examiner

*Primary Examiner* — Jonathan M Dager
(74) *Attorney, Agent, or Firm* — Ingrassia Fisher & Lorenz, P.C.

(57) ABSTRACT

Aircraft system and method are provided for a first aircraft in an airport environment, the airport environment including a second aircraft. The system includes a sensor on the first aircraft configured to determine a temperature profile of engine exhaust from the second aircraft; and a processing unit coupled to the sensor and configured to construct a velocity profile of the engine exhaust from the second aircraft based on the temperature profile and to generate a warning for a pilot of the first aircraft based on the velocity profile.

19 Claims, 4 Drawing Sheets

AIRCRAFT SYSTEMS AND METHODS FOR PROVIDING EXHAUST WARNINGS

TECHNICAL FIELD

The present invention generally relates to aircraft systems and methods, and more particularly relates to aircraft visual display systems and methods for assisting the pilot in a runway and taxiway environment.

BACKGROUND

Aircraft engine exhaust is one issue of concern in a runway or taxiway environment, particularly the impact of engine exhaust from other aircraft taxiing around the airport or preparing to take off. Aircraft exhaust may reach high velocities and undesirably influence aircraft in the same vicinity as one another. To address these issues, pilots generally maintain certain spacing away from other aircraft and attempt to anticipate when the exhaust from a nearby or approaching aircraft may be a concern.

Computer generated aircraft displays have become highly sophisticated and capable of displaying a substantial amount of flight management, navigation, and control information that gives flight crews more effective control of the aircraft and a reduction in workload. In this regard, electronic displays, such as head up displays (HUDs) and head down displays (HDDs), are used in aircraft as primary flight displays. For example, the primary flight display can combine critical flight instrumentation (e.g., altitude, attitude, heading, airspeed, vertical speed instruments) and primary engine instrument indicators into a single, readily interpretable display. Although conventional primary flight displays may provide some assistance to the pilot in runway environments, such displays do not provide any help with identifying exhaust from other aircraft.

Accordingly, it is desirable to provide systems and methods that improve situational awareness and assist the pilot in runway environments, particularly with respect to aircraft exhaust scenarios. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an aircraft system is provided for a first aircraft in an airport environment, the airport environment including a second aircraft. The system includes a sensor on the first aircraft configured to determine a temperature profile of engine exhaust from the second aircraft; and a processing unit coupled to the sensor and configured to construct a velocity profile of the engine exhaust from the second aircraft based on the temperature profile and to generate a warning for a pilot of the first aircraft based on the velocity profile.

In accordance with another exemplary embodiment, a method is provided for evaluating engine exhaust from an aircraft in an airport environment. The method includes determining a temperature profile of the engine exhaust; constructing a velocity profile based on the temperature profile; and generating a warning based on the velocity profile.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
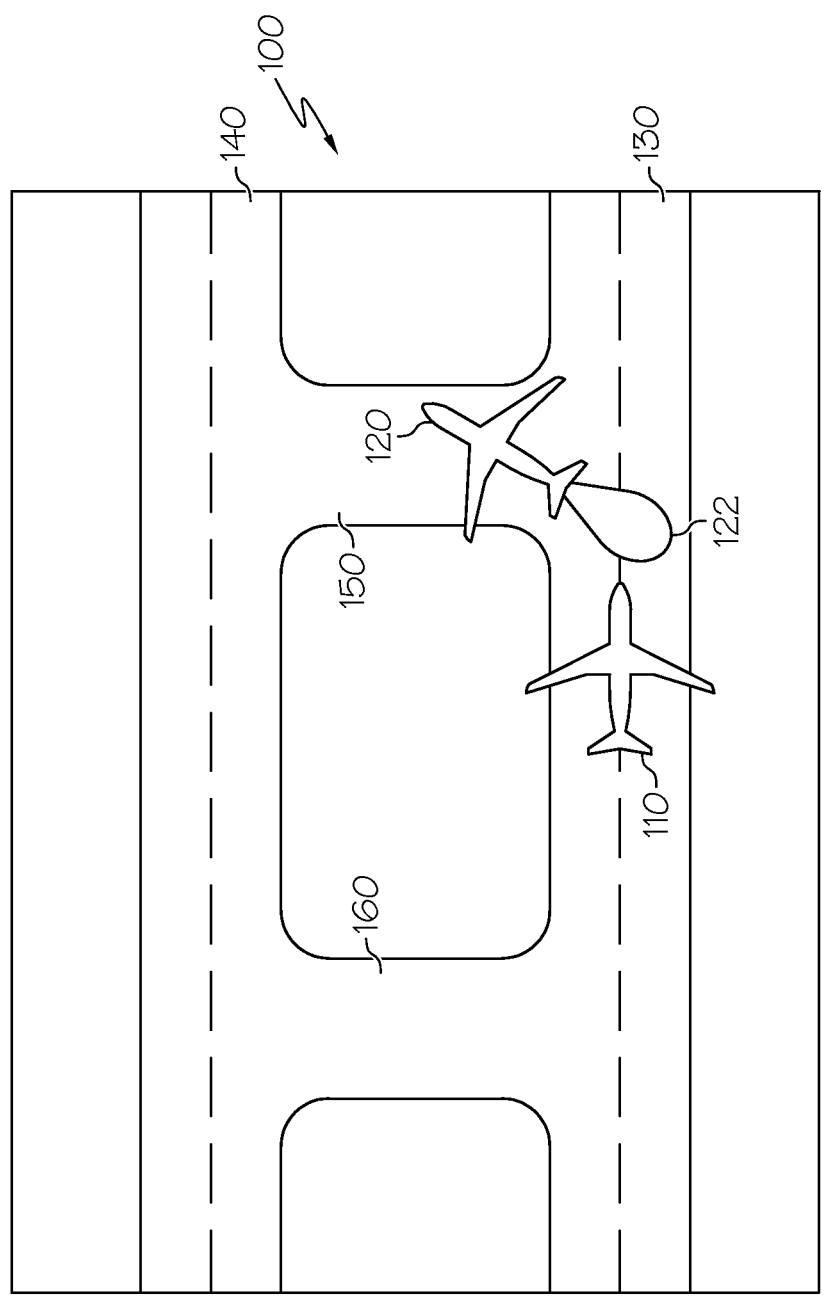
FIG. 1 is a simplified diagram of a runway environment used to describe an aircraft system in accordance with an exemplary embodiment.

FIG. 1 is a simplified diagram of a runway environment 100 used to describe the aircraft system of exemplary embodiments discussed below. As shown, the runway environment 100 may include one or more aircraft 110 and 120 and runways 130 and 140 connected by taxiways 150 and 160. The aircraft 110 and 120 may be in various modes in the runway environment, including taxiing, takeoff, rollout, or idle. In the particular scenario of FIG. 1, aircraft 110 is traveling down runway 130 and aircraft 120 is traveling between runway 130 and runway 140 on taxiway 150. As schematically shown, due to the relative positions of aircraft 110 and 120, the engine exhaust 122 of aircraft 120 may be an issue of concern for aircraft 110. In accordance with an exemplary embodiment, aircraft 110 includes a system that evaluates the characteristics of the exhaust 122 and, if necessary, provides a warning to the pilot of aircraft 110.

Figure 2:
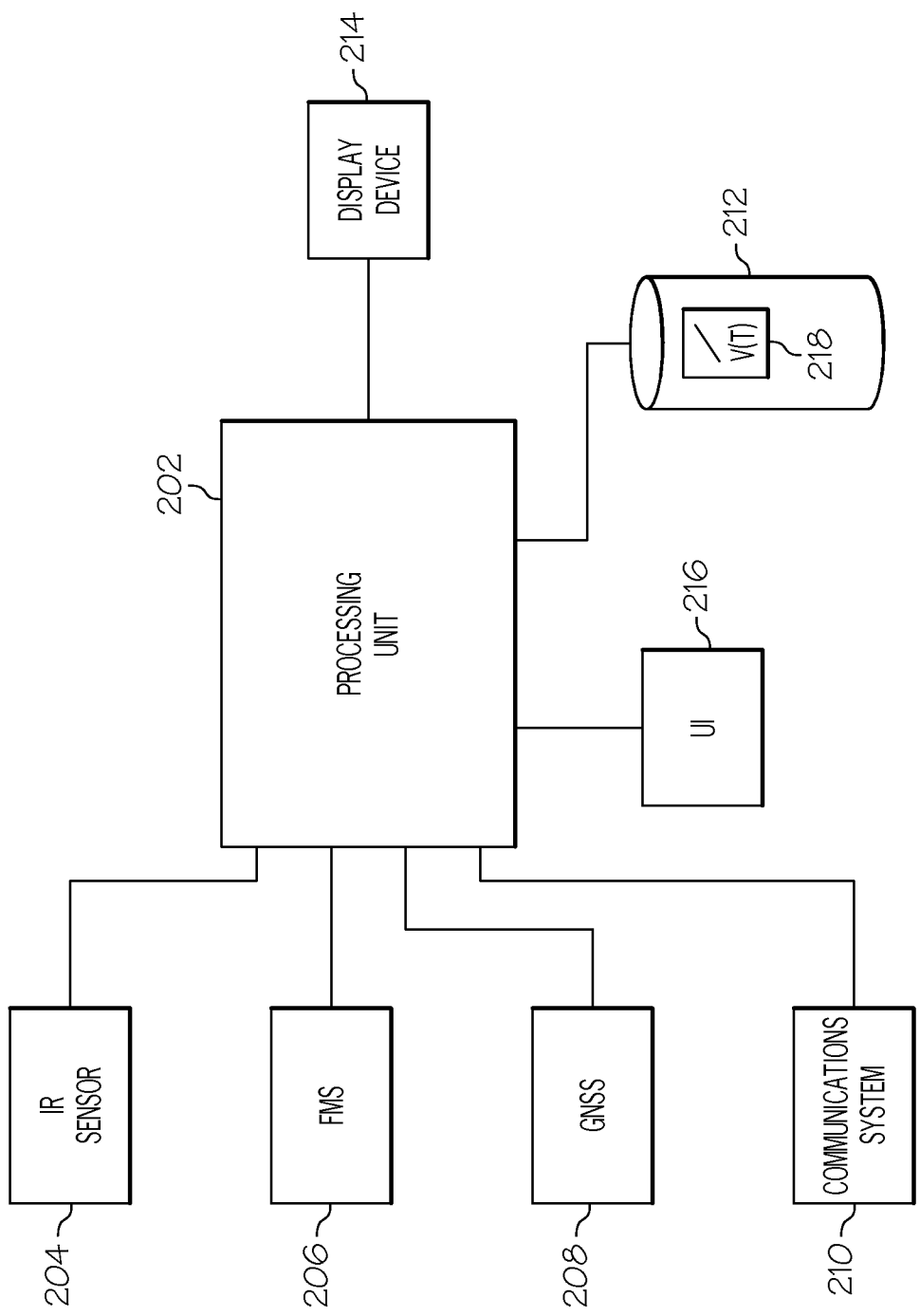
FIG. 2 is a block diagram of an aircraft system in accordance with an exemplary embodiment.

FIG. 2 is a simplified block diagram of an aircraft system 200 according to an exemplary embodiment. In the runway scenario depicted in FIG. 1, the system 200 may be installed in the aircraft 110 that may be subjected to the engine exhaust 122 of aircraft 120, although the system 200 may be used in any relevant scenario. In the exemplary embodiment shown, the system 200 includes a processing unit 202, an infrared (IR) sensor 204, a flight management system (FMS) 206, a global navigation satellite system (GNSS) unit 208, a communications system 210, database 212, a display device 214, and a user interface 216. Although the system 200 appears in FIG. 2 to be arranged as a single system on a data communications bus or systems bus, the system 200 is not so limited and can also include an arrangement whereby one or more of the processing unit 202, IR sensor 204, FMS 206, GNSS unit 208, communications system 210, database 212, display device 214, and user interface 216 are separate components or subcomponents of another system located either onboard or external to an aircraft. Also, for example, the system 200 can be arranged as an integrated system (e.g., aircraft display system, primary flight display system, a head up display with SVS or EVS as an overlay, a "near to eye display" system, or a head mounted display system, etc.) or a subsystem of a more comprehensive aircraft system (e.g., navigation and control system, target aiming and control system, collision alert and/or avoidance system, weather avoidance system, etc.). In one exemplary embodiment, one or more of the processing unit 202, IR sensor 204, GNSS unit 208, communications system 210, database 212, and display device 214 may be considered part of the FMS 206. The system 200 may be utilized in an aircraft, such as a helicopter, airplane, or unmanned vehicle. Moreover, equivalent embodiments of the system 200 may also be utilized in spacecraft and ships, as well as other types of vehicles. For simplicity, embodiments are described below with reference to "aircraft." Each of the components will be briefly introduced before a more detailed description of the function of the overall system 200.

The processing unit 202 may be a computer processor associated with a primary flight display. In general, the processing unit 202 includes or interfaces with hardware components and circuitry that support the evaluation and warnings associated with aircraft engine exhaust, as described in greater detail below. By way of example, these hardware components include one or more microprocessors, memories, storage devices, interface cards, and other standard components. Additionally, processing unit 202 includes or functions with software programs, firmware or computer readable instructions for carrying out various methods, process tasks, calculations, and control functions. The computer readable instructions, firmware and software programs are tangibly embodied on any appropriate medium used for storage of computer readable instructions including, but not limited to, all forms of non-volatile memory, including, by way of example and not by limitation, semiconductor memory devices, such as EPROM, EEPROM, and flash memory devices; magnetic disks such as internal hard disks and removable disks; magneto-optical disks; and DVD disks.

In general, the IR sensor 204 is an imaging technology that senses infrared radiation (or heat) to capture the thermal or temperature profiles of the surrounding environment, including within the runway environment 100 (FIG. 1). For example, the IR sensor 204 collects the radiation emitted from other aircraft as data representative of the intensity, propagation, and evolution of the exhaust temperatures of the other aircraft. As described below, the radiation data may be used to evaluate the exhaust and to subsequently create a corresponding velocity profile for evaluation and display. The IR sensor 204 may be, for example, a forward looking infrared sensor (FLIR), although any suitable sensor may be provided. As one example, the IR sensor 206 may have a field of view on the order of 30° horizontal and 22° vertical, although any configuration may be provided, including multiple sensors. The IR sensors 206 may be fixedly mounted with respect to the aircraft nose direction or may be movably mounted on a fixture to allow a pilot controlled field of view sweep.

Generally, the FMS 206 is configured to provide real-time aircraft status data to the processing unit 202 and may include, for example, a navigation system, a guidance and control system, and an autopilot system. In exemplary embodiments, the FMS 206 may include any suitable position and direction determination devices that are capable of providing the processing unit 202 with aircraft information, such as an Inertial Reference System (IRS) or an Air-data Heading Reference System (AHRS). In this regard, the FMS 206 may provide data related to airspeed, altitude, attitude, waypoint, and/or geographic position data for the aircraft.

The GNSS unit 208 may provide aircraft location (longitude, latitude, and altitude) information using time signals transmitted along a line-of-sight by radio from satellites. The GNSS unit 208 may include, for example, a global positioning system (GPS) receiver.

The communications system 210 is suitably configured to support communications between the ownship aircraft and other aircraft or ground location (e.g., air traffic control). In this regard, the communications system 210 may be realized using a radio communication system or another suitable data link system. In one exemplary embodiment, the communications system 210 may include, for example, an automatic dependent surveillance-broadcast (ADSB) transceiver.

Database 212 is coupled to processing unit 202 and may be a memory device (e.g., non-volatile memory, disk, drive, tape, optical storage device, mass storage device, etc.) that stores various types of aircraft information, including digital landing, waypoint, target, and terrain information as either absolute coordinate data or as a function of aircraft position. Database 212 may additionally include other types of navigation information relating to the evaluation and display of the runway environment, such as information relating to other aircraft and airport runways. The airport data may be obtained from airports, Runway Awareness and Advisory System (RAAS), airport mapping database (AMDB), and the Federal Aviation Administration (FAA). The airport data may also include a map of the airport, which includes data defining the runways at the airport, including the runway identifications and references. This data may be used to compare aircraft position with various aspects of the runway environment to subsequently generate a synthetic view of runway environment relative to the aircraft, as discussed below. Data in the database 212 may be uploaded prior to operation or received from external sources, such as an airport transmitter or onboard sensors.

In one exemplary embodiment and as discussed in greater detail below, database 212 may particularly store information 218 such as look up tables or algorithms that correlate exhaust temperature information with exhaust velocity information. Generally, higher temperatures of exhaust indicate exhaust portions of closer proximity to the emitting aircraft and increased engine activity, and as such, higher velocities.— The velocity information 218 may be generated based on data from a number of sources, including the engine manufacturer, the airport, the airline, or the FAA. Such data may also be generated through engine testing or observation.

The display device 214 includes any display element suitable for displaying the various symbols and information discussed herein. In this embodiment, the display device 214 is an aircraft primary flight display. However, any suitable type of display medium capable of visually presenting multi-colored or monochrome flight information for a pilot or other flight crew member may be provided, such as, for example, various CRT and flat-panel display systems (e.g., CRT displays, LCDs, OLED displays, plasma displays, projection displays, HDDs, HUDs, etc.). In general, using data received from the IR sensor 204, FMS 206, GNSS unit 208, communications system 210, and database 212, the processing unit 202 executes one or more algorithms (e.g., implemented in software) for evaluating aircraft characteristics and the surrounding environment. The processing unit 202 then generates display commands representing this data, and sends display commands to the display device 214. The display device 214 and/or processing unit 202 may include a graphics display generator for generating the appropriate symbology on the screen of the display device 214, as discussed in greater detail below.

The user interface 216 may include one or more of, for example, keyboards, touch screens, microphones, cursor control devices, line select buttons, and the like. In general, the user interface 216 is used to provide user feedback to system 200, including manipulating the display discussed below in reference to FIG. 4.

Figure 3:
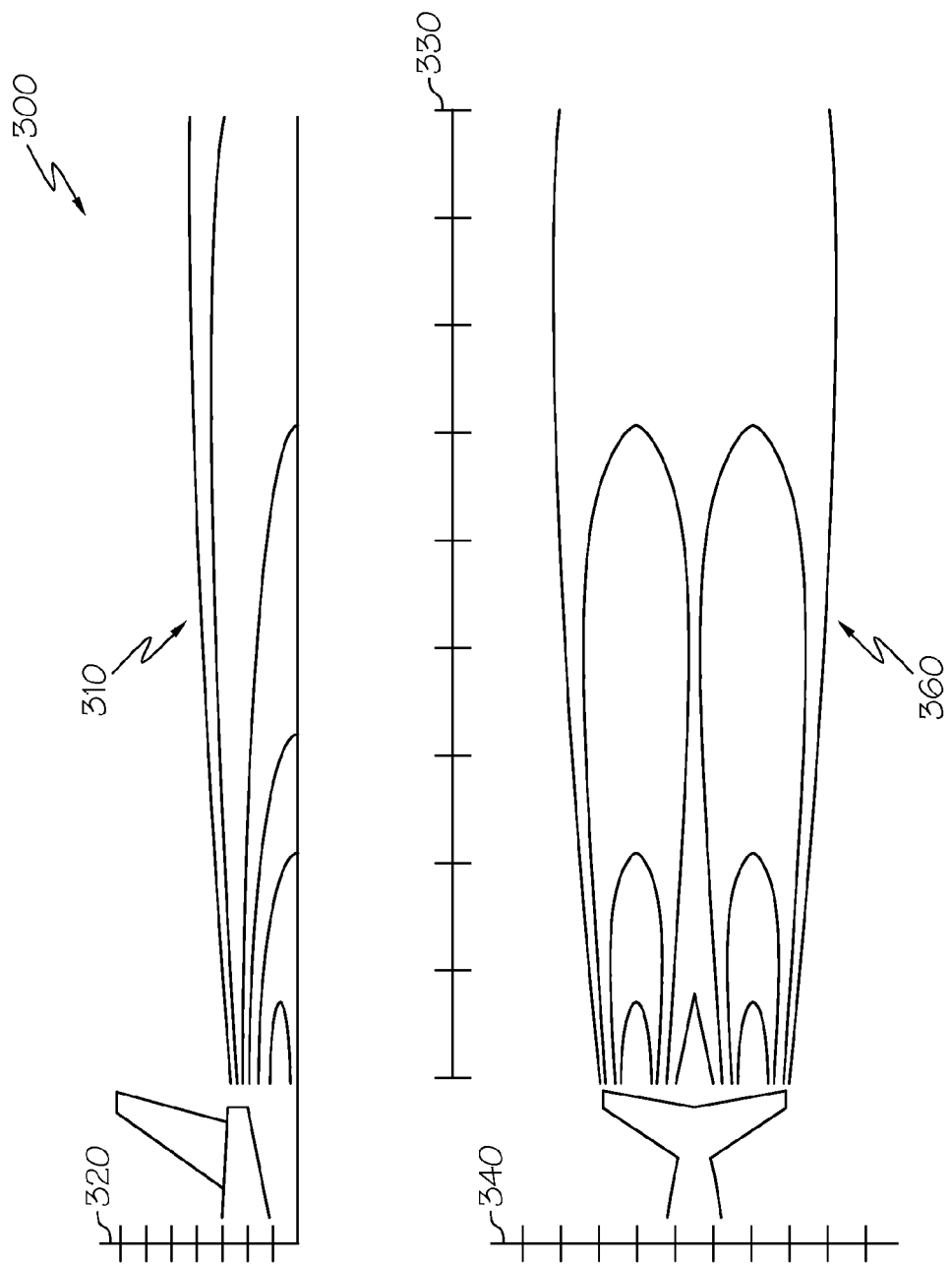
FIG. 3 is a representation of aircraft exhaust evaluated by the aircraft system of FIG. 2.

During operation of the system 200 in accordance with an exemplary embodiment, the IR sensor 204 is configured to detect radiation or radiation variation in the runway environment, such as the runway environment 100 (FIG. 1), and particularly the radiation resulting from the engine exhaust of other aircraft in the runway environment. This data is provided to the processing unit 202 such that an exhaust temperature profile (or signature) 300 may be constructed that includes the location, temperature and general footprint (e.g., length and height) of the aircraft exhaust. In one exemplary embodiment, the temperature profile 300 may appear as shown in FIG. 3, which is an exemplary representation of aircraft engine exhaust. FIG. 3 particularly shows a number of streamlines 310 and 360 represented on horizontal and vertical axis 320, 330, and 340. Each of the first streamlines 310 represents a particular temperature at the rear of an aircraft in an elevation view. The first streamlines 310 are mapped onto a vertical axis 320 that indicates the height of the temperature profile 300 off the ground and a horizontal axis 330 that indicates the horizontal distance of the temperature profile 300 behind the aircraft. Each of the second streamlines 360 represents a particular temperature at the rear of an aircraft in a plan view. The second streamlines 360 are mapped onto a vertical axis 350 that indicates the lateral spread of the temperature profile 300 from a center line of the aircraft and the horizontal axis 330 that indicates the horizontal distance of the temperature profile 300 behind the aircraft. The temperature profile 300 may be characterized and represented in any manner.

Returning to FIG. 2, the processing unit 202 may retrieve the velocity information 218 from the database 212 that correlates exhaust temperature to exhaust velocities. Based on the temperature profile collected by the IR sensor 204 and the velocity information 218, the processing unit 202 may construct a velocity profile that indicates the velocity of the aircraft exhaust, including the locations and velocity streamlines of the exhaust. As will now be described, the system 200 may evaluate the velocity profile for aircraft in the runway environment to determine if the aircraft exhaust will impact the ownship aircraft, and if so, provide an appropriate warning to the pilot.

Figure 4:
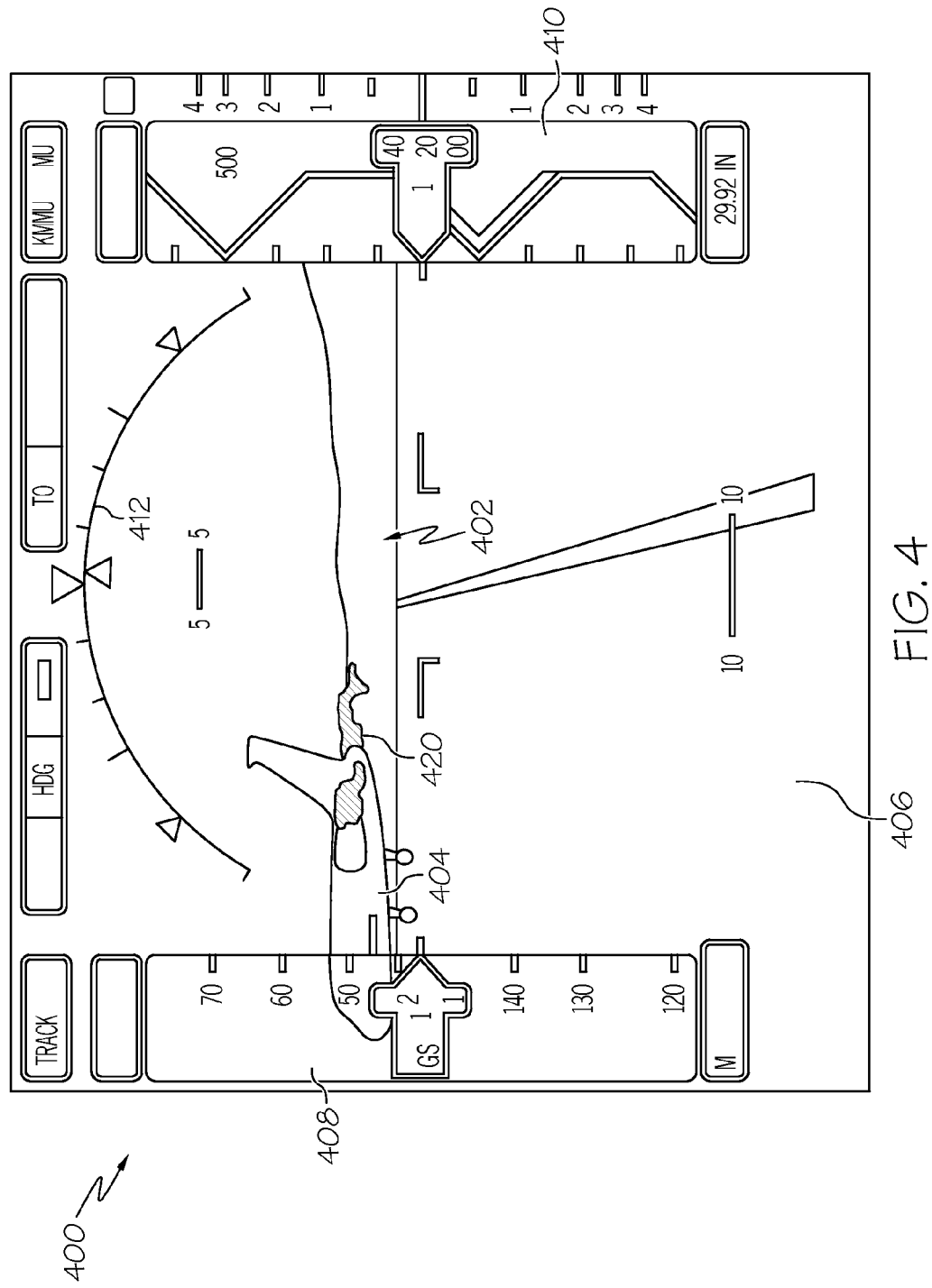
FIG. 4 is a visual display rendered by the aircraft system of FIG. 2 in accordance with an exemplary embodiment.

One mechanism for conveying this information to the pilot is shown in FIG. 4. FIG. 4 is a visual display 400 rendered by the system 200 of FIG. 2 in accordance with an exemplary embodiment. As such, FIGS. 2 and 4 are referenced below. The visual display 400 may be rendered, for example, on the display device 214. As discussed above, the processing unit 202 may generate the visual display 400 based on data from the IR sensor 204, navigation system 206, GNSS unit 208, communications system 210, database 212, and user interface 216. The visual display 400 of FIG. 4 represents the state of a dynamic display frozen at one particular time, and may be continuously refreshed in response to the current aircraft status, environmental conditions, location of the aircraft, and other factors. This visual display 400 includes several primary features that are graphically rendered. These features include, without limitation: a synthetic perspective view of the environment or terrain 402, including other aircraft 404 and the runway 406; an airspeed tape 408; an altimeter tape 410; and a compass or horizontal situation indicator 412. In practice, the visual display 400 may include any number of additional graphical elements rendered on the flight deck display element, e.g., flight data, numerical information, pilot guidance elements, trend data, and the like.

As introduced above, the visual display 400 also depicts an exhaust warning 420 associated with the engine exhaust from aircraft 404. As described above, the system 200 generally collect information about thermal radiation in the environment with the IR sensor 204, particularly the thermal radiation of the exhaust from aircraft 404, and associates the resulting temperature profile with a velocity profile. The system 200 then considers the location of the ownship aircraft, which is provided by the GNSS unit 208, and the location of the other aircraft 404. The location of the other aircraft 404 may be determined in a number of ways, including temperature profile data collected from the IR sensor 204 or a broadcast indication of the aircraft position received via the communications system 210. For example, the system 200 may construct an image of the exhaust and/or temperature profile, and the image may be registered with the current camera field of view to subsequently determine the relative position of the exhaust to the ownship aircraft. The system 200 then evaluates the relative locations and the velocity profile and issues a warning if the aircraft exhaust poses a threat, e.g., if the exhaust from aircraft 404 may adversely impact the ownship aircraft. In FIG. 4, this warning 420 is provided by rendering a visual, spatial representation of the size, shape and extent of influence of the exhaust of aircraft 404, including the location of elevated exhaust velocities in real space in relation to the aircraft 404 and other objects. The color of warning 420 may indicate the corresponding level of threat. For example, a warning color, such as red or orange, indicates to the pilot of the ownship aircraft that he should take evasive action relative to the exhaust of the aircraft 404. In another scenario, the visual display 400 may render the warning 420 in another color, such as blue in an advisory capacity to indicate that the velocity profile is not strong enough to pose a threat to the aircraft or that the aircraft 404 is too far away to be an immediate threat. In general, the exhaust warning 420 may be rendered in a color that draws the appropriate level of pilot attention without resulting in unnecessary clutter. In one exemplary embodiment, the exhaust warning 420 may appear automatically in the runway environment. In other embodiments, the display of such information may be initiated upon command from the flight crew. As the relative positions of the aircraft change and the velocity profiles change, the visual display 400 may adjust the warning 420 as appropriate. Based on this information, the pilot may take steps to mitigate or avoid any exhaust threats in an efficient manner.

Any suitable warning logic or algorithm may be used to evaluate the impact of the exhaust the corresponding warning 420. In one embodiment, the system 200 may further consider the position of aircraft 404 within the runway environment. For example, if aircraft 404 is not on a runway (e.g., on runway 130 or 140 of FIG. 1), it is unlikely that the engine of aircraft 404 engine will be operating with an output sufficient to pose a threat. As such, in this exemplary embodiment, if aircraft 404 is not on the runway, the system 200 may ignore the exhaust of aircraft 404. The system 200 may further consider the mode of aircraft 404, e.g., if the aircraft is in a break-away condition, an idle condition, or a take-off condition. For example, if aircraft 404 is not moving or has just started to move, the system 200 may ignore the exhaust of aircraft 404.

In the depicted embodiment, the system 200 generates the visual display 400 with the exhaust warning 420 that considers both the relative location and the velocity profile of the exhaust. In another embodiment, the system 200 may generate warnings 420 for all the aircraft exhaust based on velocities alone, e.g., different colors may represent different velocity streamlines. The pilot may then intuitively evaluate the various warnings 420 and maneuver around the other aircraft.

Although the visual display 400 is described as a three-dimensional primary flight display, the visual display 400 may also be a two-dimensional synthetic view or a head up display. For example, a head up display may overlay symbology described above on the appropriate position of a see-through viewing element to highlight the exhaust warnings. As another example, the visual display 400 may render a two-dimensional plan view such as that represented in FIG. 1.

Accordingly, the system 200 evaluates the exhaust of other aircraft in a runway environment and provides a visual display 400 with an intuitive warning 420 such that the pilot may avoid such aircraft exhaust. Particularly, the visual display 400 provides a direct visualization of the exhaust profile so that risk can be managed, and thus, safety is enhanced.

Embodiments of the present invention may be described in terms of functional block diagrams and various processing steps. It should be appreciated that such functional blocks may be realized in many different forms of hardware, firmware, and or software components configured to perform the various functions. For example, embodiments of the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft system for a first aircraft in an airport environment, the airport environment including a second aircraft, the system comprising:
   a database storing velocity information that correlates exhaust temperature information with exhaust velocity information;
   an infrared (IR) sensor on the first aircraft configured to detect radiation or radiation variation resulting from engine exhaust from the second aircraft; and
   a processing unit coupled to the IR sensor and configured to construct a temperature profile based on the radiation or radiation variation resulting from engine exhaust from the second aircraft, the processing unit further configured to construct a velocity profile of the engine exhaust from the second aircraft based on the temperature profile and on the velocity information from the database, the processing unit further configured to generate a warning for a pilot of the first aircraft based on the velocity profile; and
   a display device coupled to the processing unit and configured to render visual display symbology representing the warning.

2. The aircraft system of claim 1, wherein the processing unit is configured to generate display command signals based on the velocity profile, and is configured to render visual display symbology representing the engine exhaust from the second aircraft.

3. The aircraft system of claim 2, wherein the display device is configured to display symbology representing the engine exhaust as the warning.

4. The aircraft system of claim 3, wherein the display device is configured to render the engine exhaust in a predetermined color based on the velocity profile.

5. The aircraft system of claim 2, wherein the processing unit is configured to generate the warning based on relative locations of the first and second aircraft.

6. The aircraft system of claim 5, further comprising a global navigation satellite system (GNSS) unit coupled to the processing unit and configured to determine a location of the second aircraft.

7. The aircraft system of claim 5, further comprising a communications device coupled to the processing unit and configured to receive a signal indicating a location of the second aircraft.

8. An aircraft system for a first aircraft in an airport environment, the airport environment including a second aircraft, the system comprising:
   a sensor on the first aircraft configured to collect data for a temperature profile of engine exhaust from the second aircraft; and
   a processing unit coupled to the sensor and configured to construct a velocity profile of the engine exhaust from the second aircraft based on the temperature profile and to generate a warning for a pilot of the first aircraft based on the velocity profile,
   wherein the processing unit is configured to generate display command signals based on the velocity profile, and wherein the aircraft system further comprises a display device coupled to the processing unit for receiving the display command signals and to render visual display symbology representing the engine exhaust from the second aircraft,
   wherein the processing unit is configured to generate the warning based on relative locations of the first and second aircraft, and
   wherein processing unit is configured to construct an image of the temperature profile and to determine a location of the second aircraft based on the image.

9. The aircraft system of claim 2, wherein the display device is further configured to render symbology representing the second aircraft.

10. The aircraft system of claim 2, wherein the display device is further configured to render symbology representing the airport environment.

11. The aircraft system of claim 2, wherein the display device is a primary flight display.

12. The aircraft system of claim 2, wherein the IR sensor is a forward looking infrared sensor (FLIR).

13. A method for a first aircraft of evaluating engine exhaust from a second aircraft in an airport environment, comprising the steps of:
    storing, in a database, velocity information that correlates exhaust temperature information with exhaust velocity information;
    determining a temperature profile of the engine exhaust with an infrared sensor configured to detect radiation or radiation variation resulting from engine exhaust from the second aircraft, the determining step further including constructing the temperature profile based on the radiation or radiation variation resulting from engine exhaust from the second aircraft;
    constructing a velocity profile based on the temperature profile and on the velocity information from the database; and
    generating a visual display warning based on the velocity profile.

14. The method of claim 13, further comprising the steps of displaying, on a display device, visual display symbology representing the engine exhaust from the second aircraft.

15. The method of claim 14, wherein the displaying step includes displaying the engine exhaust as the warning.

16. The method of claim 15, wherein the displaying step include displaying the engine exhaust in a color indicating a threat level.

17. The method of claim 13, wherein the generating step includes generating the warning based on relative locations of the first and second aircraft.

18. The method of claim 13, wherein the displaying step includes displaying visual display symbology representing the second aircraft and the airport environment.

19. The method of claim 13, further comprising the steps of
- rendering an image with visual display symbology representing the velocity profile; and
- determining a location of the second aircraft based on the image.

* * * * *